United States Patent [19]

Radici et al.

[11] 3,979,480

[45] Sept. 7, 1976

[54] PROCESS FOR THE POLYMERIZATION OF FORMALDEHYDE

[75] Inventors: Pierino Radici, Turate (Como); Daniele Colombo, Castellanza (Varese); Paolo Colombo, Saronno (Varese), all of Italy

[73] Assignee: Societa' Italiana Resine S.I.R. S.p.A., Milan, Italy

[22] Filed: Dec. 16, 1974

[21] Appl. No.: 533,268

[30] Foreign Application Priority Data

Dec. 28, 1973 Italy .................................. 32347/73

[52] U.S. Cl. .......................... 260/857 F; 260/67 FP
[51] Int. Cl.² ......................................... C08L 77/02
[58] Field of Search .............................. 260/857 F

[56] References Cited
UNITED STATES PATENTS 3,555,514  11/1967  Van De Walle .................. 260/857 F
3,592,873  7/1971  Ishida ............................. 260/857 F

*Primary Examiner*—Murray Tillman
*Assistant Examiner*—W. C. Danison, Jr.
*Attorney, Agent, or Firm*—Flynn & Frishauf

[57] ABSTRACT

Polyformaldehyde is prepared by feeding anhydrous formaldehyde to a reaction medium containing a liquid organic diluent non-solvent for the polyformaldehyde and non-reactive towards the other constituents of the reaction medium, and containing in a dispersed form a copolymer A-B, wherein
A is a polylactonic block of recurring units

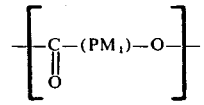

B is a polylactamic block of recurring units

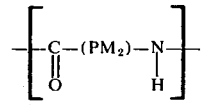

wherein $PM_1$ and $PM_2$ are linear polymethylene chains having from 2 to 13 and 3 to 13 carbon atoms, respectively.

11 Claims, No Drawings

PROCESS FOR THE POLYMERIZATION OF FORMALDEHYDE

RELATED APPLICATIONS

This application is related to applications Ser. No. 533,267; 533,269 and 533,216, all filed Dec. 16, 1974.

The invention relates to the preparation of formaldehyde polymers employing a novel class of compounds capable of catalyzing the polymerization of formaldehyde.

Formaldehyde polymers (or polyoxymethylenes) are known in the art, of a molecular weight of at least 10,000, exhibiting mechanical properties such as toughness, hardness, resiliency, exceptional stability in size and dielectric properties, such as to make them useful as plastics for technical uses.

These polyoxymethylenes are generally prepared within a wide range of temperatures by introducing anhydrous monomeric formaldehyde into an organic liquid reaction medium in the presence of a polymerization catalyst.

More particularly, the catalysts known for the purpose are of different nature, such as amino compounds, for instance aliphatic, cycloaliphatic or aromatic amines; or arsines, stibines and phosphines, in which the hydrogen atoms bonded to the arsenic, phosphorus and antimony, respectively, are substituted by hydrocarbon organic radicals.

Further catalysts employed in the art are hydrazines, salts of organic acids, such as alkali metal acetates, and compounds of the boron halides (boron trichloride and trifluoride) and aluminum trichloride type.

The above-described catalysts do not yield totally satisfactory results, above all because they often do not make possible an efficient control of the molecular weight of the formaldehyde polymer. Consequently, the polyoxymethylene produced may exhibit a wide molecular weight dispersion and inherent disadvantages. Moreover, the said catalysts should be accurately removed from the polymer on completion of polymerization, which requires expensive purification treatments.

It is known that a drawback arising in the preparation of polyoxymethylene is that formaldehyde easily polymerizes on any surface, especially if the latter is cooled, thereby forming very hard bulky crusts which generally lead to an unacceptable decay of the heat exchange coefficient and to an obstruction of pipings and valves, requiring frequent stoppages for cleaning.

No simple efficient method was found to-date, which avoids this drawback or, at least, reduces it to tolerable values.

Moreover, the processes for polymerizing formaldehyde in the presence of an organic liquid generally yield suspensions of high viscosity even at low concentrations of the polymer, which make decanting and filtering of the polymer difficult.

The drawbacks of the prior art are avoided or at least substantially reduced by the process of the invention which essentially consists in polymerizing the formaldehyde by means of a catalyst belonging to a novel class.

More particularly, according to the present invention, anhydrous monomeric formaldehyde is fed to a reaction medium comprising an organic diluent, which is liquid under the reaction conditions, non-solvent for the polyoxymethylene and inert (non-reactive) towards the further constituents of the reaction medium, and comprising a catalyst dispersed in said liquid reaction medium and consisting of a block copolymer carrying ionic couples on its macromolecular chains, the said block copolymer having the general structure A–B, wherein A is a polylactonic block consisting of recurring units:

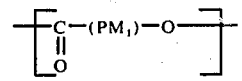

obtainable from one or more monomeric lactones of the general formula:

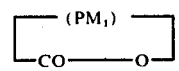

B is a polylactamic block consisting of recurring units:

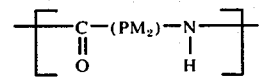

obtainable from one or more monomeric lactams of the general formula:

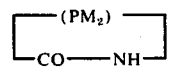

wherein $PM_1$ and $PM_2$ are linear polyoxymethylene chains having from 2 to 13 and 3 to 13 carbon atoms, respectively, non substituted or having at least one hydrogen atom replaced by an alkyl, aryl, alkylaryl or cycloalkyl radical.

Moreover, the said block copolymer contains preferably the block A in a proportion of from 1 to 89% by weight, has advantageously a molecular weight of at least 1,000 up to 50,000 and gives the best results when present in a proportion of from 0.001 to 0.5% by weight with respect to the polyoxymethylene.

As is known in the art, the polymerization of lactonic and lactamic monomers in the presence of an anionic catalyst gives rise to a copolymer of the A-B type in which A is the polylactonic block and B the polylactamic block.

On completion of the polymerization reaction, the copolymer A-B exhibits two ionic couples on the lactamic and lactonic part, respectively.

Reference is made in this connection to Makromolekulare Chemie 115 (1968), pages 33–42, 127 (1969) pages 34,53, 89 (1965) pages 27–43 and to Fortschritte der Hochpolymeren-Forschung 2, 1961, page 578–595.

These ionic couples give rise to the polymerization of the formaldehyde with the production of a polyoxymethylene of high molecular weight according to a typical progress of the living polymer.

Whichever the mechanism, the A-B copolymer acts as heterogeneous catalyst in the polymerization medium, affording an extremely high reaction rate and a polymerization yield which is almost quantitative with respect to the formaldehyde feed. This yield is in any case of at least 97–99%. Moreover, the resulting polyoxymethylene has a ratio of the ponderal average molecular weight to the numeric weight lower than 2.

This narrow molecular distribution is due to the nature of the catalyst used in the process of the invention especially when it is utilized for catalyzing the polymerization of highly pure monomeric formaldehyde.

This physical-molecular feature of the polyoxymethylene is, as is well known, of a fundamental importance for the properties of a technopolymer, above all for the toughness, the resiliency, the abrasion resistance and the stability in size of the moulded products.

By employing the said catalyst in the process of the invention, an exceptionally high ratio of the polyoxymethylene to the diluent can be obtained in the reaction medium, the said ratio reaching a value up to 1:1 by weight.

Moreover, the resulting polyoxymethylene exhibits a very high bulk density (0.6–0.8 g/ml), is easily separated by decanting and filtering from the reaction mass, the filtered polymer having a very low residual solvent content.

An advantageous feature of the process of the invention is the absence of formaldehyde polymer crusts onto the walls and stirring means in the polymerization vessel.

The catalyst does not require to be separated from the polyoxymethylene and remains linked in a stable manner to the polyoxymethylene macromolecular chain.

The presence of the blocks A-B in the polyoxymethylene affords even further advantages and desirable effects on the properties of the polyoxymethylene. As is well known, the polyoxymethylene is a polymer of a high degree of crystallinity, its properties being strictly linked to its crystalline morphology. The presence of the block A-B in the macromolecular chain is a means for affecting the said morphology in so far as a desired crystallization rate can be obtained with such a block acting as a crystallization seed.

PREPARATION OF THE CATALYST

The catalyst used in the process of the invention is prepared by catalytic polymerization of one or more lactonic monomers with one or more lactamic monomers selected among those previously defined.

The preferred lactones are ε-captolactone, δ-valerolactone, β-propiolactone, pivalolactone and ω-enanthiolactone.

The preferred lactams are: ε-caprolactam, α-pyrrolidone, ω-lauryllactam, α-piperidone and ω-enanthiolactam. The polymerization occurs in the presence of an anionic catalyst consisting of a metal derivative of a lactam.

More particularly, the said metal derivative of a lactam has the following structure:

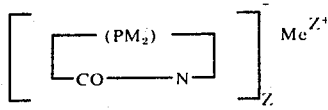

wherein Me stands for an alkali or alkaline earth metal, Z is 1 or 2, and $PM_2$ is the previously defined polymethylene chain. The preferred alkali metals are: lithium, sodium and potassium, calcium being the preferred alkaline earth metal.

The performed catalyst can be added to the polymerization medium, the catalyst being in the form of a metal derivative of a lactam.

For practical reasons, the lactam is preferably admixed in the said medium with the alkali or alkaline earth metal or one of its derivatives such as an organo-metallic compound, a hydride, an alcoxide, a phenoxide or a hydroxide, the metal derivative of the lactam being formed in the said medium.

The block copolymer A-B is preferably prepared in an anhydrous atmosphere in the absence of oxygen, and at a temperature which can vary within a wide range, generally from −20° to +300°C, though the best suited temperature, still within the above range, shall have to be selected in each individual case. Accordingly, the polymerization period can vary from 2 minutes to 6 hours. In any case, the proportion of catalyst (metal-lactam) is from 0.1 to 10 moles to 100 moles of the monomer charge.

Finally, the copolymerization of the lactam and lactone monomers can be carried out in a solvent for the A-B copolymer, in a diluent non-solvent for said copolymer or in the absence of said solvent and diluent. The resulting block copolymer A-B is separated from the reaction medium and can be utilized as such for preparing the polyoxymethylene. However, according to the preferred embodiment, the raw A-B copolymer is submitted to treatments adapted to:

— separate the A-B copolymer containing the catalytically active nuclei in its macromolecular chain;
— bring the copolymer A-B to a particulate form suitable for the subsequent polymerization of the formaldehyde.

More particularly, the A-B copolymer is purified in order to remove the unreacted monomers, the lactone homopolymer or copolymer, the free catalytic residues (not chemically bonded to the macromolecular chain) and other possible impurities.

The purification is generally carried out by dissolving the A-B copolymer in a solvent, followed by precipitation and washing of the A-B copolymer. Suitable solvents for this treatment are those in which the impurities are highly soluble and which do not destroy the catalytically active nuclei bonded to the macromolecular chain. More particularly, the solvent belongs to the following general classes: chlorinated aliphatic hydrocarbons, aromatic hydrocarbons, chlorinated aromatic hydrocarbons, aromatic nitroderivatives, substituted amides, sulphoxides and others. Examples of such solvents are: nitrobenzene, chlorobenzene, toluene, xylene, dimethylformamide and dimethyl sulphoxide.

According to an embodiment, the raw A-B copolymer is dissolved in the solvent at a temperature of from 0° to 200°C. The A-B copolymer is then precipitated by cooling the solution and/or adding a non-solvent for the copolymer. Particularly suitable non-solvents for the purpose are aliphatic hydrocarbons, such as hexane, heptane, octane and others. The A-B copolymers is then filtered and washed by means of the above described solvent till the impurities are no longer present in the filtrate. The last mentioned steps can be effected at room temperature or above.

The A-B copolymer obtained is utilized in dispersion in a diluent for catalyzing the formaldehyde polymerization; the A-B copolymer is preferably used in the form of finely divided particles in order to promote contact of its active nuclei with formaldehyde. For this reason, at the stage of the purification treatment where the A-B copolymer forms a precipitate, the conditions are preferably adjusted so that the precipitate has a particle size of from 1 to 300 microns, preferably from 1 to 100 microns.

The above-discussed treatments may be varied depending upon whether the copolymer A-B is the result of polymerization in a solvent or diluent or polymerization in the absence of said diluent and solvent.

Thus, for instance, in the case of bulk polymerization or polymerization in a molten state, the A-B copolymer is conveniently pulverized and dissolved in a suitable solvent or directly dissolved in a molten state. The copolymer A-B is then precipitated and washed. The dissolution and precipitation steps can be repeated several times.

The A-B copolymer obtained by the polymerization in a diluent (suspension technique) is normally in a suitable physical form for the subsequent polymerization of formaldehyde. It may at times be sufficient to filter the resulting suspension and thoroughly wash the solid in order to separate the undesirable impurities.

The copolymer A-B obtained by polymerization in a solvent (solution technique) is normally precipitated by cooling and/or adding a non-solvent for the copolymer, followed by filtering and washing. It will be clear from the above that the polymerization is preferably carried out by the solution or suspension technique, inasmuch as the impurities remain solubilized at least in part in the diluent or solvent.

Therefore, in this case, it is not necessary to dissolve the raw A-B copolymer in a solvent for removing the impurities and even to precipitate said copolymer in the case of a copolymerization in a diluent. In this case also, it is absolutely preferable to polymerize in a diluent, inasmuch as the copolymer A-B is then in a finely subdivided form (particle size of from 1 to 300 microns) suitable for catalyzing the polymerization of the formaldehyde.

PREPARATION OF THE POLYOXYMETHYLENE

As previously stated, the polyoxymethylene is prepared by supplying anhydrous gaseous formaldehyde to a reaction medium containing an organic diluent which is liquid under the reaction conditions, non-solvent for the polyoxymethylene and inert (non-reactive) towards the other constituents of the reaction medium, the said medium containing the catalyst in a dispersed form.

Diluents useful for the purpose are of different nature, such as ethers (diethyl ether and dimethyl ether), hydrocarbons (pentane, hexane, heptane, decane, cyclohexane, decahydronaphthalene, xylene, benzene and toluene) and chlorinated hydrocarbons (methylene chloride). Preferred diluents are hydrocarbons, more particularly those having 5-10 carbon atoms in the molecule. In no case should the diluent interfere with the active nuclei of the A-B copolymer and it should be inert (non-reactive) towards the other constituents of the reaction medium.

The anhydrous formaldehyde employed should preferably be substantially pure in order to obtain a polymer of a high molecular weight (at least 10,000).

More particularly, by impurities, the chemical compounds giving rise to chain transfer reactions and consisting of compounds of a polar character which normally react with Grignard's organo-metallic compounds are understood. More particularly, the more current impurities consist of methanol, water and formic acid. These substances act as chain transfer agents during the polymerization so that the molecular structure of the polyoxymethylene is bound to their contents.

The adjustment of the molecular weight can be entrusted to one especially added chain regulator. In this case, it is obviously possible to utilize a compound that can be of a different nature, such as a carboxylic acid having 2 carbon atoms at least, an ester having 3 carbon atoms, an aliphatic alcohol having two carbon atoms at least, a cycloaliphatic or aromatic alcohol, an anhydride of a carboxylic acid, an amide, an imine and others.

In actual practice, the water content in the formaldehyde can be reduced to a value below 100 ppm and that of the other impurities to a value below 100 ppm, which may be obtained for instance by the purification processes described in U.S. Pat. Nos. 3,118,747 and 3,184,900. These levels can obviously be varied to suit various purposes.

The polyoxymethylene obtained from the purified formaldehyde by employing the previously defined catalyst has a molecular weight which is adjusted to yield a polymeric product which, upon suitable stabilization can be injection-moulded, extruded or subjected to roto-molding and blow-molding, to give moulded articles and parts useful in practice.

The temperature adopted in the preparation of the polyoxymethylene can vary within wide limits, that is from about −120°C to the temperature of ebullition of the organic diluent employed, at any rate not exceeding 110°C, the pressure being normally maintained at atmospheric value, although a value above or below the atmospheric pressure can be adopted.

The best results are obtained by adopting a temperature range of from −30° to 70°C.

The formaldehyde polymerization can be carried out discontinuously, semi-continuously or continuously. When operating continuously, the catalyst is conveniently introduced into the reaction vessel as a suspension in the diluent. A continuous polymerization technique is disclosed for instance by U.S. Pat. No. 3,458,479.

The resulting suspension of the polyoxymethylene is filtered, the polymer being separated in the form of granules of from 50 to 700 microns depending upon the grain size of the catalyst employed. After drying, the polyoxymethylene is in the form of a powder of the previously mentioned bulk density value.

The resulting polyoxymethylene contains at least one terminal hydroxyl group in each macromolecule, which makes the product thermally unstable. In order to avoid a depolymerization at the chain end, the hydroxyl groups are substituted by ester or ether groups such as by treatment with acetic anhydride or methyl or ethyl orthoformate, respectively, or by urethane groups by treatment with an isocyanate. These treatments can be carried out by processes known in the art.

The thus treated polyoxymethylene is admixed with an antioxidant (phenolic or bisphenolic) as well as with other substances of a basic nature capable of blocking the formaldehyde or its oxidation products such as formic acid. The basic substances can be of a polymeric character, such as polyamides or polyesters polyamides.

In the following experimental Examples, the parts and percentage are understood by weight unless otherwise specified.

EXAMPLE 1

110 parts of pure ε-caprolactam stirred at 110°C in an inert atmosphere are admixed with 0.4 part of sodium metal in a 50% paraffin dispersion.

After formation of the metal-lactam, 100 parts of pure anhydrous dimethyl sulphoxide and 9 parts of ε-caprolactone are added, followed by heating at 150°C and dwelling under such conditions during 3.5 hours. During this period, an increase in viscosity of the solution is ascertained.

Cooling and precipitating yield a polymer in the form of a fine powder. The suspension is washed with anhydrous benzene to remove any soluble residue from the polymerization medium and the following checks are made on the resulting copolymer A-B:

| | |
|---|---|
| conversion percentage of the monomers | = 98 |
| nitrogen percentage | = 11.46 |
| lactone percentage | = 7.5 |
| melting point (0°C) | = 210 |
| reduced viscosity (liters. g$^{-1}$) | = 1.38 |

(In the Examples, the A-B copolymer viscosity is always measured at 35°C from a m-cresol solution containing 0.5 wt% copolymer and expressed as the ratio $$\eta \text{ reduced} = \frac{\eta \text{ specific}}{\text{concentration}} \text{ in liters.g}^{-1}.$$

— grain size:
> 125 microns : 0.2%
125 - 88 microns: 45.8%
88 - 40 microns: 30.7%
< 40 microns: 23.3%

Pure monomeric gaseous formaldehyde is introduced through a dipping tube at the bottom of a polymerization reactor containing 1,000 parts of anhydrous benzene and 0.8 part of catalyst (previously prepared copolymer A-B). The reactor is provided with a vigorous stirrer, a system for insuring inert conditions by means of a nitrogen stream and is equipped with a thermostating jacket.

Formaldehyde is supplied at a rate of 2.5 parts of per minute during 150 minutes, 0.18 part of anhydrous ethanol being simultaneously introduced, the temperature being maintained at 20°-25°C.

Stirring is pursued during 10 further minutes followed by filtering. The solid is dried in a vacuum oven at 60°-70°C, 368.5 parts of polymer having a 98.1% formaldehyde content being recovered. The resulting polyoxymethylene has an intrinsic viscosity of 1.35 liters.g$^{-1}$. In the Examples, the polyoxymethylene viscosity is always measured at 35° from a solution of p-chlorophenol with 2 wt% α pipene and expressed as the ratio $$\eta \text{ intrinsic} = \frac{\eta \text{ relative}}{\text{concentration}} \text{ in liters.g}^{-1}.$$

One part of polyoxymethylene is esterified in a reactive system containing 1.5 parts of acetic anhydride and 3.0 parts of a mixture of $C_{10}$–$C_{14}$ n-paraffins, at 150°–153°C during 20 minutes and at a pressure such as to maintain boiling conditions. Finally, cooling, filtering, thorough washing with toluene and acetone and drying in a vacuum oven at 60°C are effected. 95.8% of the polyoxymethylene thus stabilized and of an intrinsic viscosity of 1.36 liters.g$^{-1}$ are recovered.

This polyoxymethylene is subjected to the following measurements:

— $K_{220}$ : decomposition rate at 220°C in percent by weight of the polymer per minute during the first 30 minutes measured by a thermoscale.

The $K_{220}$ value is 0.08.

— bulk density : 0.62 g/ml

— The polyoxymethylene is fractionated on a steel column filled with Celite (R.T.M.) employing dimethyl acetamide as solvent and at programmed temperature. The analysis of the individual fractions shows that the polyoxymethylene has a polydispersibility ratio ($\bar{M}w/\bar{M}n$) amounting to 1.86.

— The polyoxymethylene is subjected to a physical-molecular determination by differential calorimetry and optical microscopy. The crystallization rate is determined by means of a differential scanning calorimeter under isothermic conditions at constant temperature. The radial growth rate of the crystals is determined by means of an optic microscope.

The two properties are summarized in Table 1 sub POM-1 and are indicated by τ ½ (155°C) = period of time of semi-crystallization in minutes, namely the time required for crystallizing 50% of the crystallizable matter at the indicated constant temperature and by r-microns (163°C) = average radius of the spherulites after 20 minutes crystallization at the indicated temperature.

— Further physical-chemical properties are determined after adding to the polyoxymethylene as additives 0.3% pentaerythritol tetra (beta-4'-hydroxy-3',5'-di-tert-butylphenyl) propionate and 0.25% block polymer comprising 94% ε-caprolactam and 6% ε-caprolactone and melting of the resulting mixture. The results are summarized in Table 2 sub POM-1.

EXAMPLE 2

The procedure of Example 1 is followed, pure monomeric formaldehyde being supplied to a polymerization reactor containing 1,000 parts of anhydrous toluene and 0.3 part of catalyst (copolymer A-B prepared according to Example 1).

Formaldehyde is fed at a rate of 2.5 parts of per minute, during 200 minutes, at 25°–30°C. During this period, 0.12 part of anhydrous ethanol is also added. Stirring is effected during further 10 minutes, followed by filtering, the solid being dried in a vacuum oven at 60°C. 495.5 parts of polyoxymethylene are recovered, the yield with respect to the formaldehyde feed being of 99%. The following properties of the polyoxymethylene are determined:

| | | |
|---|---|---|
| intrinsic viscosity (liters.g$^{-1}$) | | = 1.70 |
| bulk density (g/ml) | | = 0.70 |
| grain size = | > 350 microns | 3% |
| | 350–250 microns | 50.3% |
| | 250–125 microns | 37.4% |
| | < 125 microns | 9.3% |

The polyoxymethylene is esterified with acetic anhydride in the manner described in Example 1, the yield being of 96.0%. The stabilized polymer has the same intrinsic viscosity as the unstabilized polymer. The following measurements are further determined:
— $K_{220} = 0.13$
— $\bar{M}w/\bar{M}n = 1.74$

EXAMPLE 3

Preparation of the catalyst 20 parts of pure ε-caprolactam, maintained at 110°C while stirring in an inert atmosphere are admixed with 0.20 part of lithium metal in a finely subdivided form. 20 minutes later, 80 parts of ε-caprolactone are added and the temperature is brought to 150°C. The formation of the A-B copolymer is completed after 40 minutes, the molten mass being extruded under inert conditions in a reactor containing 400 parts of anhydrous pure dimethyl acetamide maintained under boiling conditions.

An efficient stirring leads to a speedy dissolution of the A-B copolymer which is then precipitated in the form of a fine powder by cooling the solution and simultaneously adding anhydrous toluene.

Purification is effected in the cold by decanting with toluene, thereby removing the dimethyl acetamide and the further impurities present in the system on completion of polymerization. Finally, a toluene suspension is obtained containing 10.2% by weight A-B copolymer.

The analysis of the copolymer shows:

| | | |
|---|---|---|
| percentage of conversion of the monomers | = | 84.8 |
| nitrogen percentage | = | 0.23 |
| lactam percentage | = | 18.5 |
| reduced viscosity (liters.g$^{-1}$) | = | 0.51 |

Preparation of the polyoxymethylene

The procedure of Example 1 is followed, formaldehyde being fed to 1.68 parts of the previously described copolymer A-B in 1,000 parts of n-heptane.

Formaldehyde is introduced at a rate of 2.5 parts of per minute during 320 minutes, simultaneously adding 0.52 part of ethanol and operating at about 0°C. Stirring is pursued during further 10 minutes, followed by filtering and drying in a vacuum oven at 60°C, 785 parts of polyoxymethylene being recovered with a polymerization yield of 98.0%.

The polyoxymethylene of an intrinsic viscosity of 1.42 liters.g$^{-1}$ and a bulk density of 0.68 g/ml is esterified with acetic anhydride as described in Example 1.

A stabilized polyoxymethylene having the same intrinsic viscosity as the non-stabilized polymer is obtained with a yield of 95.2%. The following determinations are carried out on the stabilized polymer:

— $K_{220} = 0.11$
— $\bar{M}w/\bar{M}n = 1.91$.

Further determinations are summarized in Table 1 under POM-3.

Table 1

| | POM-1 | POM-3 |
|---|---|---|
| τ½ (155°) | 25 | 12.5 |
| δ microns (163°C) | 20 | 10 |

EXAMPLE 4

The polyoxymethylene is prepared by utilizing the catalyst (copolymer A-B) prepared in Example 3. 1.0 part of copolymer A-B and 1,000 parts of benzene are charged to a reactor which is fed with pure monomeric formaldehyde at a rate of 2.5 parts of per minute during 160 minutes. At the same time 0.16 part of ethanol is added, the temperature being about 25°C. Finally, stirring during further 10 minutes, filtering and drying in a vacuum oven at 60°C, are effected, whereby 396.9 parts of polyoxymethylene are recovered with a 99.0% yield with respect to the formaldehyde feed.

The polyoxymethylene having an intrinsic viscosity of 1.82 liters.g$^{-1}$ and a bulk density of 0.71 g/ml is esterified with acetic anhydride in the manner described in Example 1. The acetylation yield amounts to 96.2%, the stabilized polyoxymethylene having an intrinsic viscosity similar to that of the unstabilized polymer; further properties are as follows:

— $K_{220} = 0.09$
— $\bar{M}w/\bar{M}n = 1.80$.

The physical-mechanical properties determined after admixture of the same additives as in Example 1 are summarized in Table 2 sub POM-4.

Table 2

| | POM-1 | POM-4 |
|---|---|---|
| Tensile strength in kg/sq.cm (ASTM D-638) | 705 | 710 |
| Elongation in % (ASTM D-628) | 25 | 77 |
| Impact strength Izod with notch in kg.cm/sq.cm (ASTM D-256) | 8.0 | 13 |

EXAMPLE 5

Preparation of the catalyst 41 parts of pure alpha-pyrrolidone are admixed with 0.48 part of potassium metal while stirring at 60°C under inert conditions.

Upon formation of the metal lactam, 100 parts of anhydrous dimethyl acetamide are added, the resulting solution being heated to 35°C, then admixed with 52 parts of δ-valerolactone and the reaction is pursued during 5 hours, whereupon 700 parts of toluene are added.

A suspension of the A-B copolymer is obtained, which is cooled and thoroughly washed by decanting with toluene so as to fully remove the reaction solvent and the other soluble substances present.

The analysis of the A-B copolymer shows:

| | | |
|---|---|---|
| percentage of conversion of the monomers | = | 83 |
| nitrogen percentage | = | 6.29 |
| lactam percentage | = | 38.2 |
| reduced viscosity (liters.g$^{-1}$) | = | 0.61 |
| melting point (°C) | = | 159 |
| grain size: | > 180 microns | 0.5% |
| | 180–125 microns | 19.5% |
| | 125–88 microns | 47.0% |
| | 88–63 microns | 15.0% |
| | 63–53 microns | 8.0% |

| | |
|---|---|
| <53 microns | 10.0% |

Preparation of the polyoxymethylene

The procedure is the same as in Example 1, monomeric formaldehyde being charged to a polymerization reactor containing 1,000 parts of toluene and 1.0 part of the previously described copolymer A-B.

Pure gaseous formaldehyde is fed at a rate of 2.5 parts of per minute during 380 minutes, 0.9 part benzoic acid being charged to the reactor as well. The temperature is 35°C and stirring is effected during 10 minutes on completion of the addition of formaldehyde. Filtering and drying in an oven vacuum at 60°C are effected and 927.2 parts of polyoxymethylene are recovered with a yield with respect to the formaldehyde feed of 97.5%.

The polyoxymethylene has an intrinsic viscosity of 1.51 liters.g$^{-1}$, a bulk density of 0.78 g/ml and the following grain size distribution:
> 250 microns : 3%
250–170 microns : 48.5%
170–125 microns : 35.5%
125–88 microns : 11.0%
< 88 microns : 2.0%

The polyoxymethylene is acetylated as described in Example 1 and the following determination is effected on the resulting polymer:
$\bar{M}w/\bar{M}n = 1.97$

EXAMPLE 6

The polyoxymethylene is prepared continuously by employing the reactor according to Example 1 modified to permit a continuous feed of toluene and catalyst (copolymer A-B) and a continuous discharge of the polyoxymethylene suspension.

The reactor is initially charged with 1,000 parts of toluene and 0.6 part of A-B copolymer prepared according to Example 5, pure gaseous monomeric formaldehyde being fed at a rate of 2.5 parts of per minute during 240 minutes. The continuous discharge of the suspension of polyoxymethylene and continuous introduction of toluene (so as to maintain a constant level in the reactor) and of the A-B copolymer (0.15 part per hour) are then started.

The formaldehyde is constantly fed at the above mentioned rate, the suspension in the reactor being maintained at a concentration in polymer of 37.5%. Propyl alcohol is also introduced during the reaction in a quantity of 0.08 part of per hour. The reaction is carried out continuously during 40 hours with an average production of 147 parts of polyoxymethylene per hour, in the form of a powder having an intrinsic viscosity of 1.82–1.85 liters.g$^{-1}$ and a bulk density of 0.61 g/ml.

After stopping the feeds, the reaction is allowed to proceed for 10 further minutes whereupon the reactor contents are discharged.

The polymerization reactor including both the static part (walls and suspension transference pipe) and the stirrer remains thoroughly clean on completion of the reaction. A slight deposit of polymer on peculiar zones such as on the dry-wet limit is easily crumbled as this is no actual crust.

One part of the resulting polyoxymethylene is stabilized by etherification in a reactive system consisting of 0.4 part of triethyl orthoformate, 0.8 part of anhydrous dimethyl acetamide, 2 parts of a mixture of $C_{10}$–$C_{14}$ n-paraffins and ethylene sulphate in a proportion of 0.13% with respect to the total of the liquid components. The reaction mixture is maintained at 150°–153°C during 15 minutes, then cooled, filtered, the polyoxymethylene being washed with toluene containing 1% triethanolamine, then with methanol. Finally, drying in a vacuum oven at 60°C is effected and 99% of the polymer subject to stabilization is recovered in stabilized form.

The stabilized polyoxymethylene is subjected to the following determinations: intrinsic viscosity $\eta_{in}$, bulk density $\gamma$, $K_{220}$ and alkali-stable fraction (FAS).

The latter determination is effected on the polymer in a benzyl alcohol solution containing 1% triethanolamine at a temperature of 150°–152°C during 30 minutes. The polymer: benzyl alcohol ratio amounts to 1:10. The polymer is then precipitated by cooling, filtered, washed with methanol and dried. The unaltered polymer percentage on completion of the treatment is indicated as the alkali-stable fraction (FAS).

The results are summarized in Table 3 sub POM 6. The stabilized polyoxymethylene is subjected to the determination of the value of Mw/Mn which was found to be 1.75. A further fraction of the stabilized polyoxymethylene is admixed with 0.3% 4,4'-butylidene-bis (6-tert-butyl-meta-cresol) and 0.25% of a block copolymer comprising 94 parts of ε-caprolactam and 6 parts of ε-caprolactone, homogenized, melted, whereupon the physical-mechanical properties summarized in Table 4 sub POM-6 are determined.

EXAMPLE 7

Preparation of the catalyst

Operating in a way similar to that of Example 3, at 200°C during 4 hours, a copolymer A-B comprising 5 parts of pivalolactone and 95 parts of lauryllactam is prepared, employing 0.15 part of lithium metal as catalyst. The molten mass is then charged under inert conditions to a reactor containing 400 parts of boiling anhydrous pure dimethyl acetamide.

The A-B copolymer is precipitated from the resulting solution in the form of a fine powder by cooling and adding anhydrous toluene, then purified in the cold with anhydrous toluene in the conventional manner.

The analysis of the A-B copolymer shows:

| | | |
|---|---|---|
| percentage of conversion of the monomers | = | 98.5 |
| percentage of nitrogen | = | 6.75 |
| lactam percentage | = | 95.0 |

Preparation of the polyoxymethylene

The procedure of Example 1 is followed and formaldehyde is charged to a polymerization reactor containing 1,000 parts of cyclohexane and 0.36 part of catalyst (above described copolymer A-B).

The formaldehyde is introduced at a rate of 2.5 parts of per minute during 100 minutes, adding at the same time 2.1 parts of diphenylamine, the temperature being about 25°C.

Finally, stirring during 10 minutes, filtering and drying in a vacuum oven at 60°C are effected, 240.4 parts of polyoxymethylene being recovered of:

| | | |
|---|---|---|
| intrinsic viscosity (liters.g$^{-1}$) | | = 1.75 |
| bulk density (g/ml) | | = 0.68 |
| grain size: | > 600 microns | 0.5% |
| | 600–375 microns | 70.5% |
| | 375–175 microns | 25.5% |
| | < 175 microns | 3.5% |

A fraction of the resulting polyoxymethylene is etherified by proceeding as in Example 6, the reaction yield amounting to 97.5%. The determinations summarized in Table 3 under POM-7 are effected on the stabilized polyoxymethylene.

A further fraction of etherified polyoxymethylene is admixed with 0.3% 4,4'-butylidenebis(6-tert-butyl-metacresol) and 0.25% of a block polymer comprising 94 parts of ε-caprolactam and 6 parts of ε-caprolactone.

The mixture is homogenized and melted, the physical-chemical properties being determined as summarized in Table 4 sub POM-7.

Table 3

| | POM-6 | POm-7 |
|---|---|---|
| $\eta_{in}$ (liters.g$^{-1}$) | 1.48 | 1.74 |
| $\gamma_\alpha$ (g/ml) | 0.62 | 0.69 |
| $K_{220}$ (%) | 0.12 | 0.10 |
| FAS (%) | 98.7 | 96.5 |

Table 4

| | POM-6 | POM-7 |
|---|---|---|
| Melt index at 195°C(g/10') (ASTM D 1238) | 5.3 | 2.6 |
| Tensile strength (Kg/sq.cm.) | 706 | 710 |
| Elongation (%) | 35 | 75 |
| Impact strength Izod with notch (Kg.cm/sq.cm) | 10 | 15 |

What we claim is:

1. A method for preparing a polyoxymethylene, comprising the step of supplying anhydrous monomeric formaldehyde to a reaction medium comprising an organic diluent which is a liquid and non-solvent for the polyoxymethylene under the reaction conditions and inert towards the other constituents of the reaction medium, and comprising from 0.001 to 0.5 percent by weight of a catalyst based upon the polyoxymethylene, dispersed in said medium, said catalyst having a molecular weight of from 1,000 to 50,000, containing block A in a proportion of from 1 to 89 weight percent, and consisting of a block copolymer carrying ionic couples on its macromolecular chain, said block copolymer being defined by the general structure A-B in which:

A is a polylactonic block consisting of recurring units:

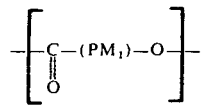

obtainable from at least one monomeric lactone of the general formula:

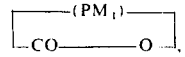

B is a polylactam block consisting of recurring units:

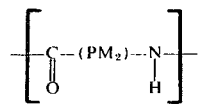

obtainable from at least one monomeric lactam of the general formula:

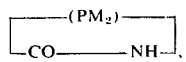

wherein PM$_1$ and PM$_2$ are polymethylene chains having from 2 to 13 and 3 to 13 carbon atoms, respctively, non-substituted or having at least one hydrogen atom replaced by a radical selected from the group consisting of alkyl, aryl, alkylaryl and cycloalkyl radicals.

2. The method of claim 1, wherein the said lactone is selected from the group consisting of ε-caprolactone, δ-valerolactone, β-propiolactone, pivalolactone and ω-enanthiolactone.

3. The method of claim 1, wherein the said lactam is selected from the group consisting of ε-caprolactam, α-pyrrolidone, ω-lauryllactam, α-piperidone and ω-enanthiolactam.

4. The method of claim 1, wherein the diluent is selected from the group consisting of ethers, hydrocarbons and chlorinated hydrocarbons.

5. The method of claim 1, wherein the reaction temperature is from −120° up to the temperature of ebullition of the diluent, said diluent having a temperature of ebullition not exceeding 110°C.

6. The method of claim 1, wherein the reaction temperature is from −30° to 70°C.

7. The method of claim 1, wherein the block copolymer A-B is obtained by catalytic copolymerization of said lactamic and lactonic monomers at a temperature of from −20°C to 300°C and during a period of from 2 min to 6 hours, the catalyst employed being in a proportion of from 0.1 to 10 moles for 100 moles lactonic and lactamic monomers and being defined by the general formula:

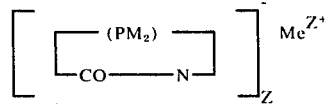

wherein Me is selected from the group consisting of the alkali and alkaline earth metals, Z is 1 or 2 and PM$_2$ is the said polymethylene chain.

8. The method of claim 6, wherein the block copolymer A-B is obtained by copolymerizing said monomers in a solvent for the forming copolymer A-B.

9. The method of claim 6, wherein the block copolymer A-B is obtained by copolymerizing said monomers in a diluent non-solvent for the forming copolymer A-B.

10. The method of claim 1, wherein the said dispersed catalyst is in the form of particles 1 to 300 microns in size.

11. The method of claim 10, wherein said particles are 1 to 100 microns in size.

* * * * *

UNITED STATES PATENT OFFICE
CERTIFICATE OF CORRECTION

PATENT NO. : 3,979,480
DATED : September 7, 1976
INVENTOR(S) : PIERINO RADICI et al It is certified that error appears in the above-identified patent and that said Letters Patent are hereby corrected as shown below:

Column 12, line 17: replace "$\gamma$," with --- $\gamma_\alpha$, ---.

Signed and Sealed this second Day of August 1977

[SEAL]

Attest:

RUTH C. MASON
*Attesting Officer*

C. MARSHALL DANN
*Commissioner of Patents and Trademarks*